United States Patent [19]

Ishiguro et al.

[11] Patent Number: 5,357,334
[45] Date of Patent: Oct. 18, 1994

[54] SPECTROANALYZER CORRECTING FOR DETERIORATION OF TRANSMISSIBILITY

[75] Inventors: Yoichi Ishiguro; Haruhiko Aikawa; Minoru Watanabe, all of Yokohama; Yoshiaki Ichige; Fumitoshi Okamoto, both of Naka, all of Japan

[73] Assignees: Sumitomo Electric Industries Ltd., Osaka; Doryokuro Kakunenryo Kaihatsu Jigyodan, Tokyo, both of Japan

[21] Appl. No.: 992,647

[22] Filed: Dec. 18, 1992

[30] Foreign Application Priority Data

Dec. 18, 1991 [JP] Japan .................. 3-335062

[51] Int. Cl.⁵ ............................................ G01J 3/443
[52] U.S. Cl. ............................ 356/73.1; 250/227.23
[58] Field of Search ............... 250/227.21, 227.23; 356/73.1

[56] References Cited

U.S. PATENT DOCUMENTS 4,376,890  3/1983  Engstrom et al. ............. 250/227.23
4,726,676  2/1988  Maslaney et al. .................. 356/73.1

FOREIGN PATENT DOCUMENTS 3070804  3/1990  Japan .
2156136  6/1990  Japan .
9002324  3/1990  PCT Int'l Appl. .

OTHER PUBLICATIONS

Wallace et al, "Engineering Optical Fibre Sensors For Process Control", GEC Journal of Research, vol. 2, No. 1 1984.

Primary Examiner—Vincent P. McGraw
Attorney, Agent, or Firm—Cushman, Darby & Cushman

[57] ABSTRACT

A spectroanalyzer accurately spectroanalyzes in spite of the deterioration of transmissibility of an optical fiber (5) by radiation, by using a light from a sample cell (1) as a measurement light which passes through the optical fiber (5). The spectroanalyzer comprises a white light source (15) for directing a monitoring light to a one end (5b) of the optical fiber (5), and a half-mirror (3) arranged in front of the other end (5a) of the optical fiber (5) for reflecting the monitoring light, which is modulated to permit the discrimination thereof from the measurement light. Accordingly, a degree of deterioration of the optical fiber (5) can be determined from the monitoring light, and the affect of the deterioration of the transmissibility can be corrected by dividing a measurement light power by a monitoring light power so that the accurate measurement of the sample cell 1 is attained in spite of the deterioration of the transmissibility of the optical fiber (5).

4 Claims, 2 Drawing Sheets

SPECTROANALYZER CORRECTING FOR DETERIORATION OF TRANSMISSIBILITY

BACKGROUND OF THE INVENTION

1. Field of the Invention

The present invention relates to an apparatus for spectroanalysis by using a light transmitted from an object under test through an optical fiber placed in a radiation environment.

2. Related Background Art

An optical fiber has a property that when it is irradiated with a radiation, a transmissibility thereof is gradually lost and eventually it reaches a level which does not enable spectroanalysis. In JP-A-63-309707, it has been proposed to prolong a life of the spectroanalyzer by utilizing a so-called photo-bleaching effect in which a radiation induction loss is recovered by a strong light. FIG. 1 shows an example of the spectroanalyzer which utilizes the photo-bleaching effect.

As shown in FIG. 1, the prior art spectroanalyzer comprises a sample cell 1 which is an object to be tested, micro-lenses 2 and 6, an optical fiber 5, a photo-bleach light source 14 and a spectrometer 16.

A light (measurement light) emitted from the sample cell 1 is condensed by a micro-lens 2 and directed to the spectrometer 16 through the optical fiber 5, the micro-lens 6 and a wave combiner 9. Since a portion of the optical fiber 5 which is inside a shield wall 4, that is, which is exposed to the sample cell 1 is in a radiation environment, a transmissibility thereof gradually falls if the optical fiber 5 is left as it is and finally the spectroanalysis is disabled. A structural defect of a molecule level occurs in the optical fiber by the irradiation of the radiation and the light is absorbed thereby so that a light transmission loss of the optical fiber increases and the transmissibility is deteriorated. By irradiating a photo-bleach light to the optical fiber 5 by using the photo-bleach light source 14 and the wave combiner 9, the structural defect of the molecule level is extinguished and the progress of the deterioration of the transmissibility is delayed.

However, even by the irradiation of the photo-bleach light, the transmissibility is still deteriorated gradually, and the light transmission loss increases and the light intensity passed through the optical fiber 5 decreases. Accordingly, the spectroanalyzer is not sufficient when reproductability is required.

SUMMARY OF THE INVENTION

It is a object of the present invention to provide a spectroanalyzer which permits accurate measurement without being totally affected by a light transmission loss of an optical fiber in spite of a problem due to the deterioration of the transmissibility.

In order to achieve the above object, the spectroanalyzer of the present invention comprises a monitoring light supply means for directing a monitoring light for the optical fiber loss to an optical fiber under radiation, semitransparent reflection means for reflecting a portion of the monitoring light directed to the optical fiber back to the input end, and spectroanalyzing means including means for separating the monitoring light from a measurement light.

By detecting change in the intensity of the monitoring light, a status of deterioration of the optical fiber by the radiation is detected and the measurement light is corrected based on the detection output. By modulating the monitoring light, the monitoring light may be discriminated from the measurement light during the signal processing by the spectroanalyzing means even if the monitoring light is directed to the spectroanalyzing means together with the measurement light.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENTS

Figure 1:
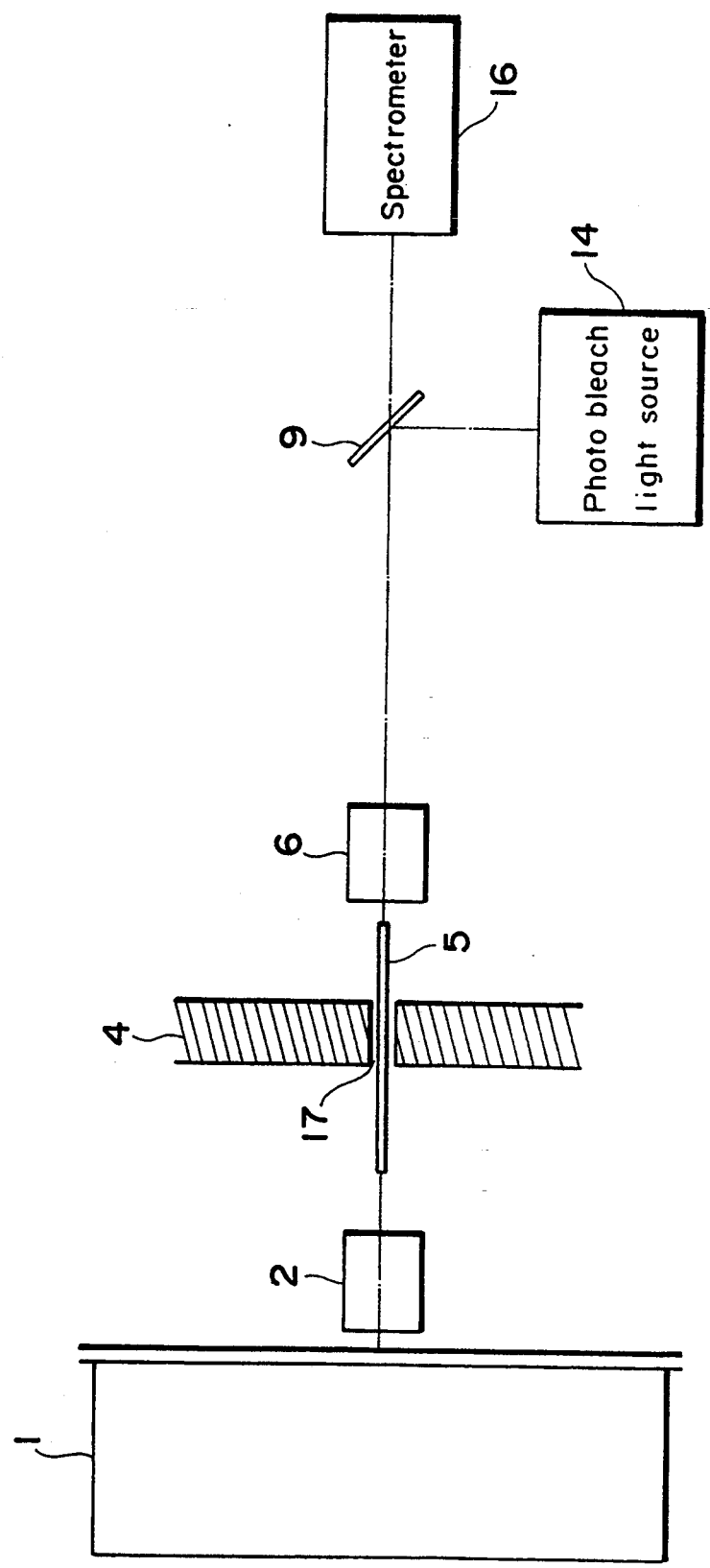
FIG. 1 shows a configuration of a prior art spectroanalyzer.
Figure 2:
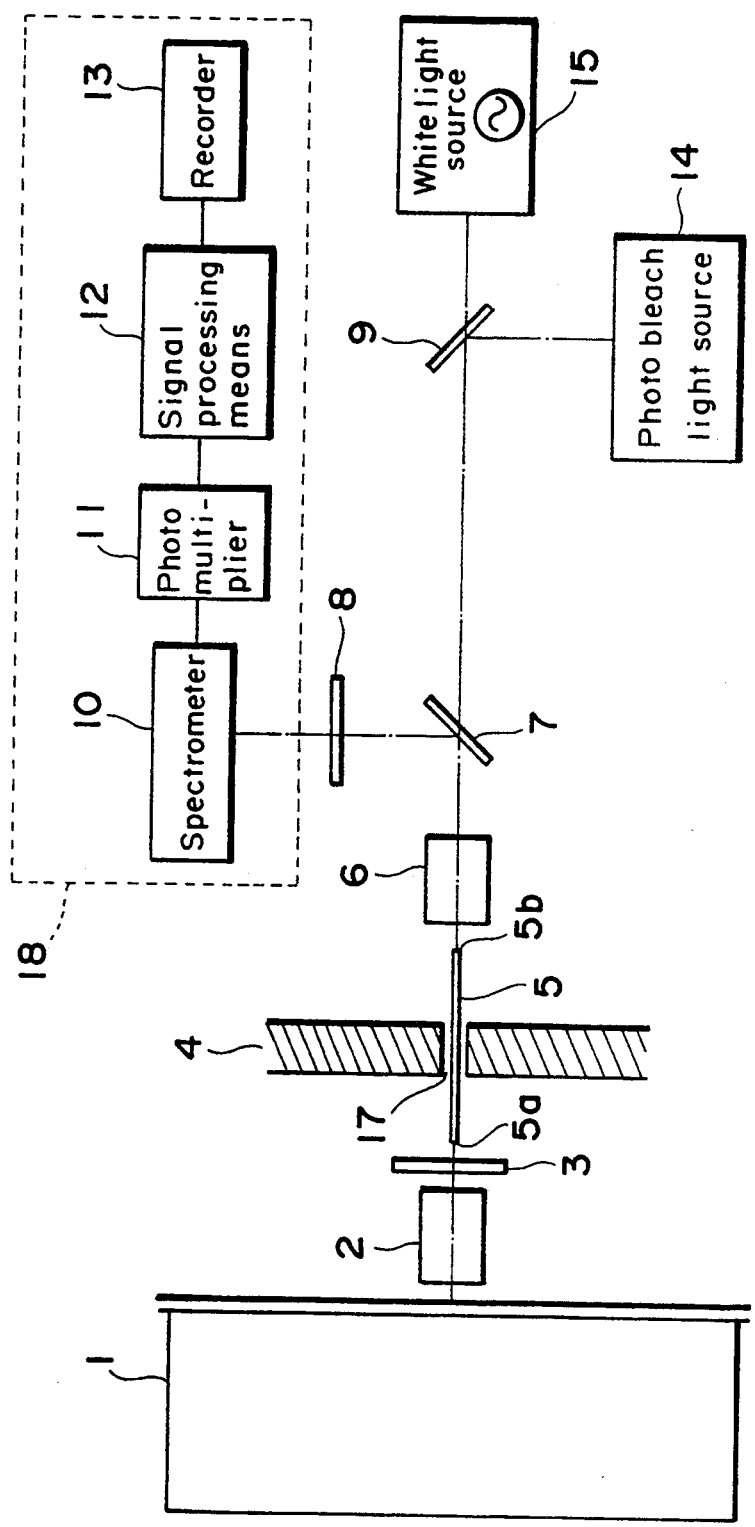
FIG. 2 shows a configuration of one embodiment of a spectroanalyzer of the present invention for luminescence spectroanalyzing a radiative material.

In FIG. 2, a sample cell 1 which is an object to be tested is disposed in an area surrounded by a radiation shielding wall 4 because a luminescence material therein has a radiative capability. One end 5a of an optical fiber 5 faces the sample cell 1, and a micro-lens 2 and a half-mirror 3 are arranged between the sample cell 1 and the one end 5a of the optical fiber 5. A measurement light emitted from the sample cell 1 is directed to the one end 5a of the optical fiber 5 through the lens 2 and the half-mirror 3. The half-mirror 3 is used as semitransparent reflection means for reflecting a portion of a monitoring light (to be described later) emitted from the one end 5a of the optical fiber 5 back to the end 5a.

The optical fiber 5 extends to an exterior of the shielding wall 4 through a through-hole 17 formed in the shielding wall 4. The portion of the optical fiber 5 which is inside of the shielding wall 4, that is, which is exposed to the sample cell 1 is irradiated with the radiation from the sample cell 1 and is under a radiation environment. A micro-lens 6, a wave combiner 7, a filter 8, a wave combiner 9, a photo-bleach light source 14, a while light source 15 and spectroanalyzing means 18 are provided externally of the shielding wall 4 in which the other end 5b of the optical fiber 5 is located. In FIG. 2, there is shown a clearance between the shielding wall 4 and the optical fiber 5 in the through-hold 17. In actual, the clearance is filled with a radiation sealing material to prevent the radiation from leaking externally of the shielding wall 4.

The white light source 15 irradiates a modulated white light as a fiber loss monitoring light, which is directed to the end 5b of the optical fiber 5 through the wave combiners 9 and 7 and the micro-lens 6. The wave combiner 9 is a half-mirror which transmits therethrough the monitoring light from the white light source 15 and reflects a photo-bleach light from a photo-bleach light source 14 and directs both lights to the end 5b of the optical fiber 5. The wave combiner 7 is a half-mirror which transmits therethrough the light from the wave combiner 9 and directs it to the micro-lens 6, and reflects the light from the micro-lens 6 toward a filter 8 which selectively blocks the photo-bleach light of the light from the wave combiner 7. The spectroanalyzing means 18 comprises a spectrometer 10, a photo-multiplier 11, signal processing means 12 and a recorder 13. The photo-multiplier 11 is used as photoelectric conversion means which converts the light spectrometered by the spectrometer 10 into a electrical signal and amplifies it. The signal processing means 12 separates the electrical signal output by the photo-multiplier 11 to a monitoring light signal component and a measurement light signal component, calculates the light intensities thereof, and normalizes the measurement light signal component by using the monitoring light signal component. The normalization is defined as a correction process of eliminating an affect by the deterioration of the optical fiber by the radiation from the measurement light signal component.

The photo-bleach light source 14 irradiates a photo-bleach light for recovering a damage of the optical fiber 5 by the radiation. The photo-bleach light is directed to the optical fiber 5 through the wave combiners 9 and 7 and the micro-lens 6, extinguishes the structural defect of the molecule level of the optical fiber 5 created by the radiation, and recovers the transmissibility of the optical fiber 5. A portion of the photo-bleach light directed to the optical fiber 5 is reflected by the half-mirror 3 back to the end 5b. A filter 8 provided in front of the spectrometer 10 functions to prevent such reflected-back photo-bleach light from being directed to the spectrometer 10. The photo-bleach light source 14 is preferably one which emits a strong light in an ultraviolet area around 200~500 nm wavelength such as Xenon lamp, heavy hydrogen lamp, mercury lamp, helium cadmium laser or YAG laser triple wave.

An operation of the present embodiment is now explained.

The measurement light is condensed by the micro-lens 2, directed to the end 5a of the optical fiber 5 through the half-mirror 3, directed to the optical fiber 5, emits from the other end 5b of the optical fiber 5, and is directed to the spectrometer 10 through the micro-lens 6, the wave combiner 7 and the filter 8. The measurement light directed to the spectrometer 10 is photoelectrically converted by the photo-multiplier 11 which serves as the photoelectric converter, and the converted signal is supplied to the signal processing means 12. The micro-lenses 2 and 8 are provided to enhance the photo-sensitivity of the apparatus.

A modulated white light is emitted from the white light source 15. The white light emitted from the white light source 15 passes through the wave combiners 9 and 7, the micro-lens 8 and the optical fiber 5 and a portion thereof is reflected by the half-mirror 3. The reflected white light then passes through the optical fiber 5 and the micro-lens 8, and is directed to the spectrometer 10 through the wave combiner 7 and the filter 8. The white light directed to the spectrometer 10 is photoelectrically converted by the photo-multiplier 11 and the converted signal is supplied to the signal processing means 12. Accordingly, the white light as the monitoring light and the light from the sample cell 1 as the measurement light are applied to the signal processing means 12, which can separate the monitoring light from the measurement light because the monitoring light is modulated. Thus, the powers of those lights can be separately detected. The power of the measurement light is gradually weakened by the affect of the deterioration of the transmissibility of the optical fiber 5 and the power of the white light is weakened as well. By dividing the power of the measurement light by the power of the white light, the power of the measurement light is corrected to eliminate the affect of the deterioration of the transmissibility. Those powers are recorded by the recorder 13.

The photo-bleach light source 14 emits the photo-bleach light. The photo-bleach light is directed to the wave combiner 9 which serves as a photo-coupler, and thence it is directed to the optical fiber 5 through the wave combiner 7 and the micro-lens 6 to recover the optical fiber 5. Even if the photo-bleach light is reflected by the half-mirror 3 back to the optical fiber 5, the photo-bleach light is prevented from being directed to the spectrometer 10 because the filter 8 which blocks the wavelength of the photo-bleach light is arranged in front of the spectrometer 10.

In the present embodiment, the filter 8 is arranged in front of the spectrometer 10 in order to permit the irradiation of the photo-bleach light during the measurement, but the filter 8 is not necessary where the photo-bleach light is irradiated only during non-measurement.

In accordance with the present invention, the measurement light can be accurately measured in spite of the deterioration of the transmissibility of the optical fiber, by dividing the power of the spectrometered light which is affected by the deterioration of the transmissibility of the optical fiber, by the modulated white light power. By adding the photo-bleach light supply means, the deterioration of the optical fiber can be suppressed and the spectroanalyzer having high accuracy and long life is provided.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A spectroanalyzer correcting for deterioration of transmissibility, comprising:

an optical fiber having first and second ends, said first end facing an object to be tested to receive a measurement light from said object and said first end of said optical fiber being exposed to a radiation environment;

a monitoring light source separated from said radiation environment, said monitoring light source supplying a modulated white light to said second end of said optical fiber;

a first semitransparent reflector arranged between said object and said first end of said optical fiber, said first semitransparent reflector, for reflecting the modulated white light issued from said first end to return the reflected light to said first end of said optical fiber;

a spectroanalyzing means including a spectrometer (10), a photo-electric converter (11) and a signal processor (12), said signal processor electrically separating a first electrical signal corresponding to the light from the object and a second electrical signal corresponding to the white light issued from the second end and, to normalize the first electrical signal with the second electrical signal to produce a detection signal; and a second semitransparent reflector arranged between said monitoring light source and said second end of said optical fiber, said second semitransparent reflector guiding the white light and the light issued from the object both of which are emitted from said second end to said spectrometer of said spectroanalyzing means and said second semitransparent reflector passing the modulated white light issued from said monitoring light source to guide to the second end of said optical fiber.

2. A spectroanalyzer according to claim 1 further comprising photo-bleach light supply means for irradiating a photo-bleach light to recover deterioration of the optical fiber by the radiation.

3. A spectroanalyzer according to claim 2 further comprising a filter arranged in front of a photosensing part of said spectroanalyzing means for preventing the photo-bleach light emitted from said second end of the optical fiber from transmitting therethrough.

4. A spectroanalyzer according to claim 3 wherein said photo-bleach light is an ultraviolet light having wavelength of 200~500 nm.

* * * * *